(12) United States Patent
Brown et al.

(10) Patent No.: US 11,131,866 B2
(45) Date of Patent: *Sep. 28, 2021

(54) INDEX MATCHING LAYERS

(71) Applicant: Vision Ease, LP, Ramsey, MN (US)

(72) Inventors: Jeff Brown, St. Louis Park, MN (US); Michael S. Boulineau, Forest Lake, MN (US); Michael Marshall, Andover, MN (US); Tim Reynolds, Roseville, MN (US)

(73) Assignee: Vision Ease, LP, Ramsey, MN (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/560,781

(22) Filed: Sep. 4, 2019

(65) Prior Publication Data

US 2020/0004044 A1    Jan. 2, 2020

Related U.S. Application Data

(63) Continuation of application No. 15/694,638, filed on Sep. 1, 2017, now Pat. No. 10,444,538.

(60) Provisional application No. 62/382,924, filed on Sep. 2, 2016.

(51) Int. Cl.
*G02C 7/02* (2006.01)
*G02B 5/23* (2006.01)
*G02B 1/111* (2015.01)

(52) U.S. Cl.
CPC .............. *G02C 7/022* (2013.01); *G02B 1/111* (2013.01); *G02B 5/23* (2013.01); *G02C 7/02* (2013.01)

(58) Field of Classification Search
CPC .... G02C 7/02; G02C 7/022; B32B 2307/418; B32B 7/02
USPC ............................... 351/159.01, 41; 428/212
See application file for complete search history.

(56) References Cited

U.S. PATENT DOCUMENTS

| | | | |
|---|---|---|---|
| 4,609,267 A | 9/1986 | Deguchi et al. | |
| 9,908,306 B2 | 3/2018 | Hara | |
| 10,444,538 B2 * | 10/2019 | Brown | G02B 1/111 |
| 2008/0160186 A1 | 7/2008 | Pokorny et al. | |
| 2009/0239048 A1 | 9/2009 | Sugihara et al. | |
| 2010/0279088 A1 | 11/2010 | Naito et al. | |
| 2012/0315485 A1 | 12/2012 | Iwazumi et al. | |
| 2013/0196149 A1 | 8/2013 | Determan et al. | |
| 2016/0026008 A1 | 1/2016 | Olund et al. | |

FOREIGN PATENT DOCUMENTS

| | | |
|---|---|---|
| CL | 199300774 | 6/1994 |
| CL | 199501994 | 10/1996 |
| CL | 200101214 | 1/2002 |
| CL | 201502726 | 3/2016 |

(Continued)

OTHER PUBLICATIONS

Chinese Patent Office, Office Action dated Jun. 23, 2020 with English translation in Chinese Patent Application No. 2017800638809, 19 pages.

(Continued)

*Primary Examiner* — Hung X Dang
(74) *Attorney, Agent, or Firm* — Inskeep IP Group, Inc.

(57) ABSTRACT

Optical devices such as eyeglass lenses and digital displays having improved optical characteristics achieved, in part, through incorporation of an index matching system between material layers having different refractive indices.

17 Claims, 21 Drawing Sheets

Reflectance (%) vs. Wavelength (nm)

(56) References Cited

FOREIGN PATENT DOCUMENTS

| | | |
|---|---|---|
| CL | 201602052 | 2/2017 |
| CN | 102905892 A | 1/2013 |
| JP | H07253501 A | 10/1995 |
| WO | WO2015123473 A1 | 8/2015 |
| WO | WO2016054198 A1 | 4/2016 |

OTHER PUBLICATIONS

European Patent Office, Supplementary Extended European Search Report dated Mar. 17, 2020 in European Patent Application No. 17847652.9, 21 pages.
Chilean Patent Office, Examination Report dated Mar. 10, 2020 with English translation in Chile Patent Application No. 201900546, 28 pages.
WIPO, U.S. International Search Authority, International Search Report and Written Opinion dated Nov. 13, 2017 in International Patent Application No. PCT/US2017/049951, 8 pages.
Wiley, R.R., "Predicting achievable design performance of broadband antireflection coatings," *Applied Optics*, vol. 32, No. 25, Oct. 1, 1993, pp. 5447-5451, 5 pages.

\* cited by examiner

| Material | n (550 nm) |
|---|---|
| SiO2 | 1.46 |
| ZrO2 | 2.15 |
| Y2O3 | 1.75 |
| SiOxNy | 1.68 |
| Primer_1 | 1.62 |
| Primer_2 | 1.55 |
| Primer_3 | 1.50 |

| Design 1a | |
|---|---|
| Material | Thickness (nm) |
| Hi_Index Lens | Bulk |
| ZrO2 | 4.2 |
| SiO2 | 40.0 |
| ZrO2 | 6.3 |
| HC (1.50 Index) | 4000 |

Fig. 11

| Design 1b | |
|---|---|
| Material | Thickness (nm) |
| Hi_Index Lens | Bulk |
| ZrO2 | 7.0 |
| SiO2 | 50.0 |
| ZrO2 | 6.3 |
| HC (1.50 Index) | 4000 |

Fig. 16

| Design 2 | |
|---|---|
| Material | Thickness (nm) |
| Hi_Index Lens | Bulk |
| SiO2 | 15.9 |
| Y2O3 | 33.7 |
| SiO2 | 41.5 |
| Y2O3 | 26.0 |
| SiO2 | 53.4 |
| Y2O3 | 9.9 |
| SiO2 | 8.0 |
| HC (1.50 Index) | 4000 |

| Sample ID | Hard Coating | Y - Unactivated | Y - Activated |
|---|---|---|---|
| 1.67 Photo NHC | None | 83.8 | 14.4 |
| 1.67 Photo No Match | n=1.48, No match | 85.4 | 13.6 |
| 1.67 Photo with Match | n=1.48, Match (Design 2) | 86.1 | 13.9 |
| 1.67 Photo H604 | n = 1.60 HC | 85.5 | 19.5 |
| 1.67 Photo H673 | n = 1.67 HC | 84.2 | 19.4 |

| Design 3 ||
|---|---|
| Material | Thickness (nm) |
| Hi_Index Lens | Bulk |
| SiO2 | 12.6 |
| SiOxNy | 47.9 |
| SiO2 | 35.1 |
| SiOxNy | 32.0 |
| SiO2 | 48.0 |
| SiOxNy | 11.2 |
| SiO2 | 2.0 |
| HC (1.50 Index) | 4000 |

Fig. 23

| Design 4 ||
|---|---|
| Material | Thickness (nm) |
| Hi_Index Lens | Bulk |
| Primer_1 | 59.2 |
| Primer_2 | 60.8 |
| Primer_3 | 60.7 |
| HC (1.50 Index) | 4000 |

INDEX MATCHING LAYERS

RELATED APPLICATIONS

This application is a continuation of and claims priority to U.S. patent application Ser. No. 15/694,638 filed Sep. 1, 2017 entitled Index Matching Layers, which claims benefit of and priority to U.S. Provisional Application Ser. No. 62/382,924 filed Sep. 2, 2016, entitled Index Matching Layers, which is hereby incorporated herein by reference in its entirety.

FIELD OF THE INVENTION

The present invention relates to systems and methods for reducing interference fringes in optical and display applications and, more particularly, to the incorporation of refractive index matching systems between refractive mismatched layers and/or substrates.

BACKGROUND OF THE INVENTION

High refractive index ophthalmic eyeglass lenses are attractive options for their increased refractive power and decreased thickness. However, the common use of low refractive index backside hard-coatings creates interference fringes on such lenses which can strongly detract from the appearance of the lens.

Common ophthalmic lenses are made from relatively soft polymeric materials prone to scratching. Hence, in order to provide adequate surface robustness, lenses must be coated with a scratch resistant coating. Such "hard-coatings" are often formed from urethane lacquers, siloxane polymers, or colloidal dispersions of oxide nano-particles, such as silicon dioxide, $SiO_2$. These layers are usually deposited by dip based processes, coating both sides of the lens. A typical thickness of the coating is in the range of 1-5 micrometers in order to achieve the desired abrasion resistance with high adhesion and resistance to cracking. In this range of thickness, the hard-coatings can have an effect on the cosmetic performance of the lens. This is especially the case when the hard-coating is not closely index matched to the lens material. The reflection from an interface is given by Formula A:

$$R = \left[\frac{(n_1 - n_o)}{(n_1 + n_o)}\right]^2$$

Where $n_o$ is the index of the incident medium (typically air) and $n_1$ is the index of the other surface forming the interface. Consider the example of a high index lens ($n_1$=1.70) and an incident medium of air ($n_o$=1). The reflection at this interface can then be calculated as 6.72%. This is for a single interface; hence, a total reflection of the lens is 13.4%. This shows the importance of antireflection coatings to lower this number and increase the transmission. The most common hard-coatings have an index of 1.5, significantly different from the 1.70 lens. The reflection from the hard-coating is lower than the reflection from the lens surface. While this would initially seem beneficial (lowering the reflection), the interface between the hard-coating and the lens also generates a reflection which must also be considered. The different reflections are shown below in Table 1.

TABLE 1

| Interface | $n_1$ | $n_o$ | Reflectance (%) |
|---|---|---|---|
| Lens - Air | 1.70 | 1.00 | 6.72 |
| Hard-Coating - Air | 1.50 | 1.00 | 4.00 |
| Lens - Hard-Coating | 1.70 | 1.50 | 0.39 |

While the magnitude of the reflection from an interface between a 1.7 (lens) and 1.5 (hard-coating) index step is much smaller than the other reflections it has a significant impact on the reflected spectrum from the lens. Since light is a wave the reflections from the different interfaces combine destructively or constructively depending on the wavelength of light. For example, in FIG. 1, the straight line is the reflection from a single surface of a 1.67 index lens with an index matched hard-coating. The oscillating line is the single surface reflection of a 1.67 index lens with a 1.5 index, mismatched hard-coating that is 4 micrometers thick. As can be seen, the effect is very large—varying the reflection from over 6% to almost as low as 2%. These oscillations give rise to a coloration of the lens surface. Since typical hard-coatings are deposited by dip processes, they are not perfectly uniform which means the reflection spectra changes over the lens surface. This, in turn, generates interference effects similar to the fringes observed on a soap bubble and significantly detracts from the appearance and performance of a lens The above example demonstrates the advantages to using index matched hard-coatings for any given lens material. However, there are several limitations that can prevent this from occurring. First, hard-coatings are not available in all commercially used lens material indices. There is a trend towards increasing lens indices to better serve individuals requiring high refractive powers and to allow thinner more attractive lenses. However, new lens material development is often in advance or ahead of the development of hard-coatings having similar indices. Therefore, it is often the case that lens materials new to the market place do not have closely refractive index matched hard-coatings available.

The second limitation relates to processing a lens blank into a finished lens. When a semi-finished lens is made into a specific prescription for a patient, the back surface of the lens is ground away and polished to a specific curve to generate the desired optical refracting power. The removal of material from the back surface of the lens also removes the factory applied hard-coating. In most labs, a new or replacement backside hard-coating is applied via spin coating and UV curing. The available UV cured, spin coat, hard-coatings are mostly based on siloxane chemistries which limits the refractive index to around 1.5. Accordingly, in the case of high index lenses, the effect described above occurs on the back surface of the lens. Because high index materials have increased refractive power relative in comparison to common lens materials, such as CR39, high index lens materials are often employed for prescriptions with high corrective power. However, the increased refractive power also allows the lens thickness to be decreased which many eyeglass wearers find attractive. Unfortunately, this desirable decrease in lens thickness is often accompanied by the degradation in the appearance of the lens due to the index mismatch between the hard-coating and the lens.

Applying an antireflective, AR, coating to such a lens can make the above-described problem worse. The oscillation in the reflectance is still present in the reflection spectrum, albeit with a reduced amplitude. However, the amplitude of the oscillation is similar in magnitude to the reflection from the AR coating. This can result in distortion of the color of the antireflection coating. Since the hard-coating thickness changes over the lens surface, the distortion changes over the lens surface making it very noticeable. This effect is shown in FIGS. 2A and 2B which provide a comparison of a reflection spectrum of a lens having an antireflection coating with an index matched hard-coating (FIG. 2A) versus a lens having an antireflection coating with a mismatched hard-coating, i.e. a 1.5 index hard-coating on a 1.67 index lens (FIG. 2B). The straight lines in FIGS. 2A and 2B represent the reflection from the surface of the lens without a hard coating or an antireflective coating applied.

A third limitation relates to the use of index matching hard-coatings for photochromic lenses. Photochromic lenses contain one or more photochromic dyes in a layer on top of a lens, in a laminate embedded inside of a lens, or dispersed within the bulk lens material. When exposed to a specific wavelength band of light, the dyes undergo a reversible transformation between a clear, high light-transmitting state and a darkened, reduced light-transmitting state. In ophthalmic lenses, this functionality is employed to make lenses darken when used outside in sunlight and clear or clearer when used indoors. The wavelengths of light responsible for this color transformation are in the UV spectrum, typically between 300 to 400 nm. This creates a potential problem when the photochromic functionality is combined with high index hard-coatings.

For example, to achieve high refractive indices, commercially available hard-coatings contain dopants such as $TiO_2$ or thio-urethanes. Both materials are UV absorbing and reduce the amount of UV light reaching a photochromic dye employed on or within the photochromic lens. This is shown in FIG. 3 which compares the transmission spectrum of two commercially available hard-coatings; HC-A having a refractive index near 1.50 (low index) and HC-B having a refractive index near 1.67 (high index). The reduced transmission of HC-B from 300 to 380 nm will degrade the performance of a UV activated photochromic material. To maintain the performance, it would therefore be necessary to use a coating more like HC-A. However, this would then lead to the same color variation and degraded appearance as described above.

In view of the above, it becomes apparent that there is a need in the field for a means of utilizing the available and commercially common low index hard-coatings with high index lenses and other optical substrates while minimizing the undesirable optical effects, e.g. interference fringes, of the typical mismatched refractive indices of the hard-coating and high index optical substrates.

OBJECTS AND SUMMARY OF THE INVENTION

These objectives are achieved by the present invention, in part, by providing an eyeglass lens having reduced interference fringes comprising a base lens substrate having a first refractive index; an index matching system disposed on a surface of the base lens substrate; and a coating disposed on a surface of the index matching system having a second refractive index that differs from the first refractive index by 0.08 or greater.

In certain embodiments of the present invention: the base lens substrate comprises a high index lens material; the base lens substrate comprises a functional film laminate; the base lens substrate comprises a photochromic property; the index matching system is disposed on a front and/or back surface of the base lens substrate; the index matching system comprises a series of layers of materials wherein immediately adjacent layers of materials have distinct refractive indices relative to one another; the index matching system comprises a series of alternating urethane-based layers having different refractive indices; the coating is a UV cured hard-coating; the first refractive index (the lens substrate) is equal to or greater than 1.60 and the second refractive index (the coating) is approximately 1.50; the eyeglass lens further comprising an antireflective system disposed on the coating; the eyeglass lens has a single surface peak-to-peak reflectance variation within the visible spectrum of equal to or less than 2 percent, equal to or less than 1 percent, or equal to less than 0.5 percent; and the index matching system comprises a multilayered system; and combinations thereof.

These objectives are also achieved by the present invention, in part, by providing a system for improving optical characteristics in optical devices comprising a first material layer having a first refractive index; a second material layer having a second refractive index different from the first refractive index; and an index matching system interposed between the first material layer and the second material layer that attenuates a total reflectance of incident light of the optical device.

In certain embodiments of the present invention: the optical device is an eyeglass lens; the optical device has a single surface peak-to-peak reflectance variation within the visible spectrum of equal to or less than 2 percent, equal to or less than 1 percent, or equal to less than 0.5 percent; the index matching system comprises a series of layers of materials wherein immediately adjacent layers of materials have distinct refractive indices relative to one another; and combinations thereof.

These objectives are further achieved by the present invention, in part, by providing a method for reducing interference fringes observed in an optical article comprising: obtaining a base lens substrate having a first refractive index; forming an index matching system on a surface of the base lens substrate having a plurality of material layers with different refractive indices relative to one another; and applying a coating on a surface of the index matching system having a second refractive index that differs from the first refractive index by 0.08 or greater.

In certain embodiments of the present invention: obtaining the base lens substrate having the first refractive index comprises obtaining an eyeglass lens; forming the index matching system on the surface of the base lens substrate having the plurality of material layers with different refractive indices relative to one another comprises forming a series of layers of materials wherein immediately adjacent layers of materials have distinct refractive indices relative to one another; and combinations thereof.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which

FIG. 11 is a table showing the configuration of an index matching system according to one embodiment of the present invention.

FIG. 16 is a table showing the configuration of an index matching system according to one embodiment of the present invention.

FIG. 18 is a table showing the photochromic responses of a photochromic lens employing an index matching system according to one embodiment of the present invention between an index mismatched lens substrate and hard-coating and the photochromic responses of various photochromic lenses not employing an index matching system according to the present invention.

FIG. 23 is a table showing the configuration of an index matching system according to one embodiment of the present invention.

DESCRIPTION OF EMBODIMENTS

Figure 1:
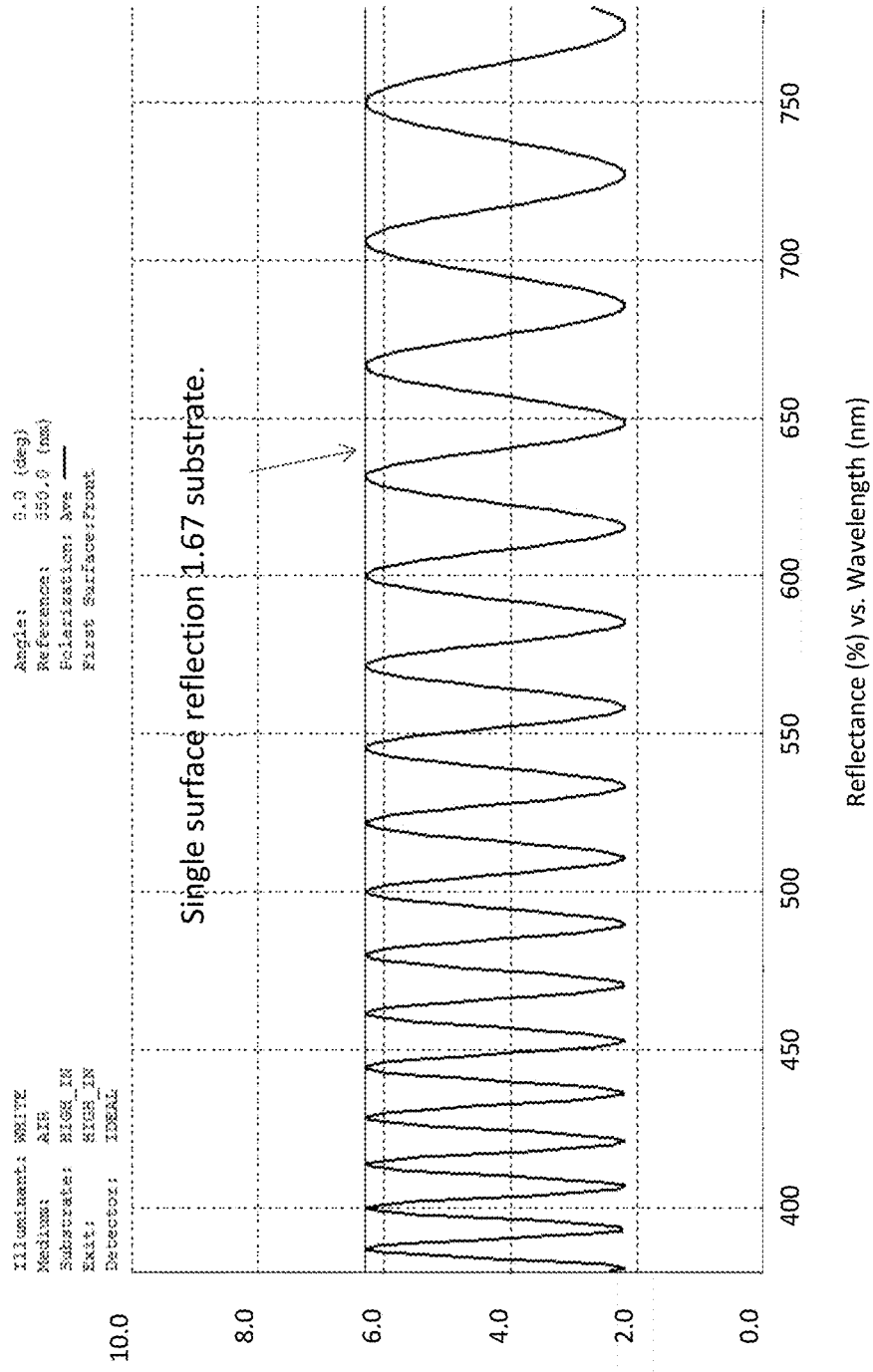
FIG. 1 is a graph comparing the percent reflectance relative to wavelength of a 1.67 index lens with an index matched hard-coating and a 1.67 index lens with a 1.5 index, mismatched hard-coating.
Figure 2A:
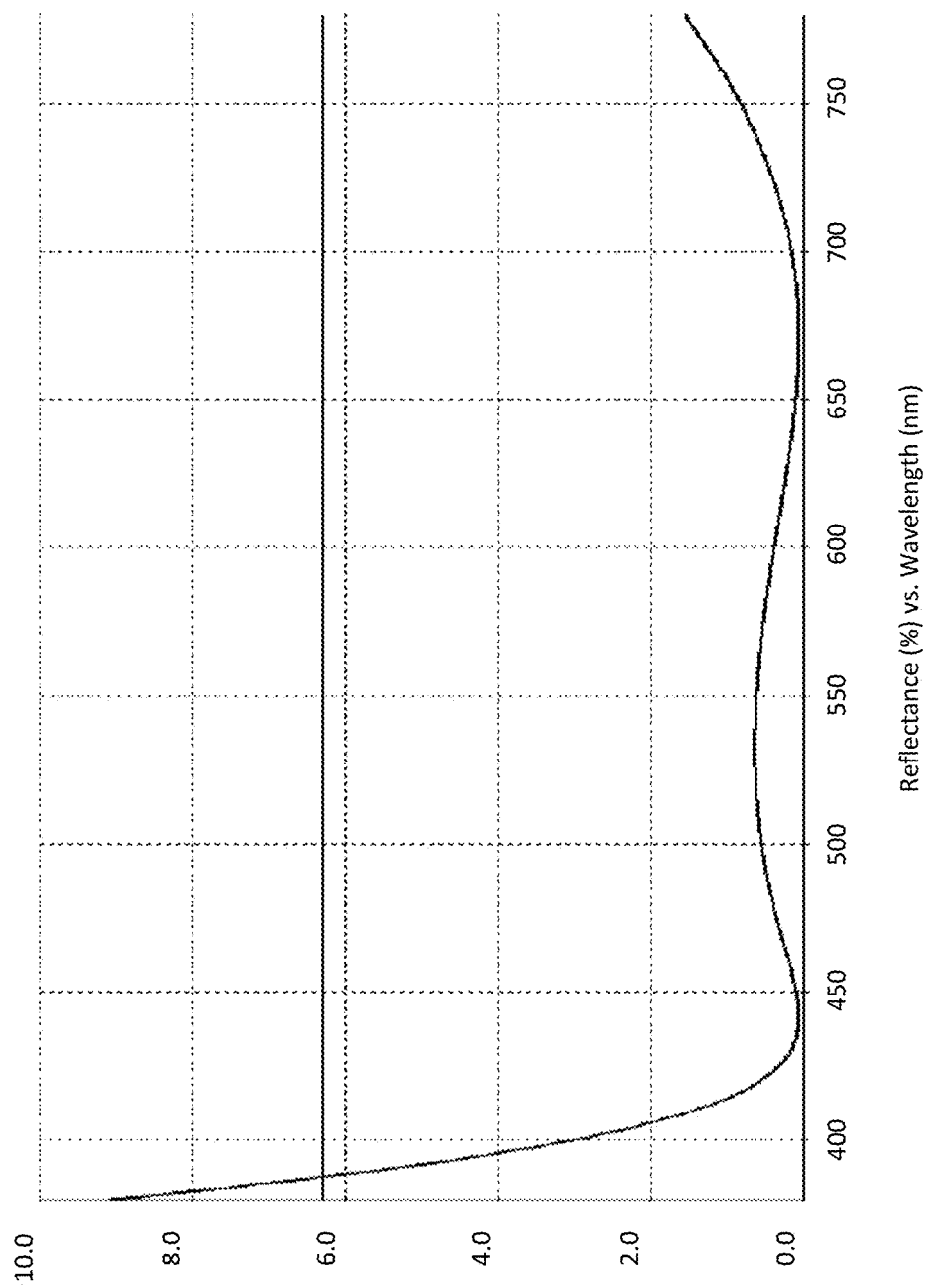
FIG. 2A is a graph showing the percent reflectance relative to wavelength of a lens having an antireflection coating with an index matched hard-coating.
Figure 2B:
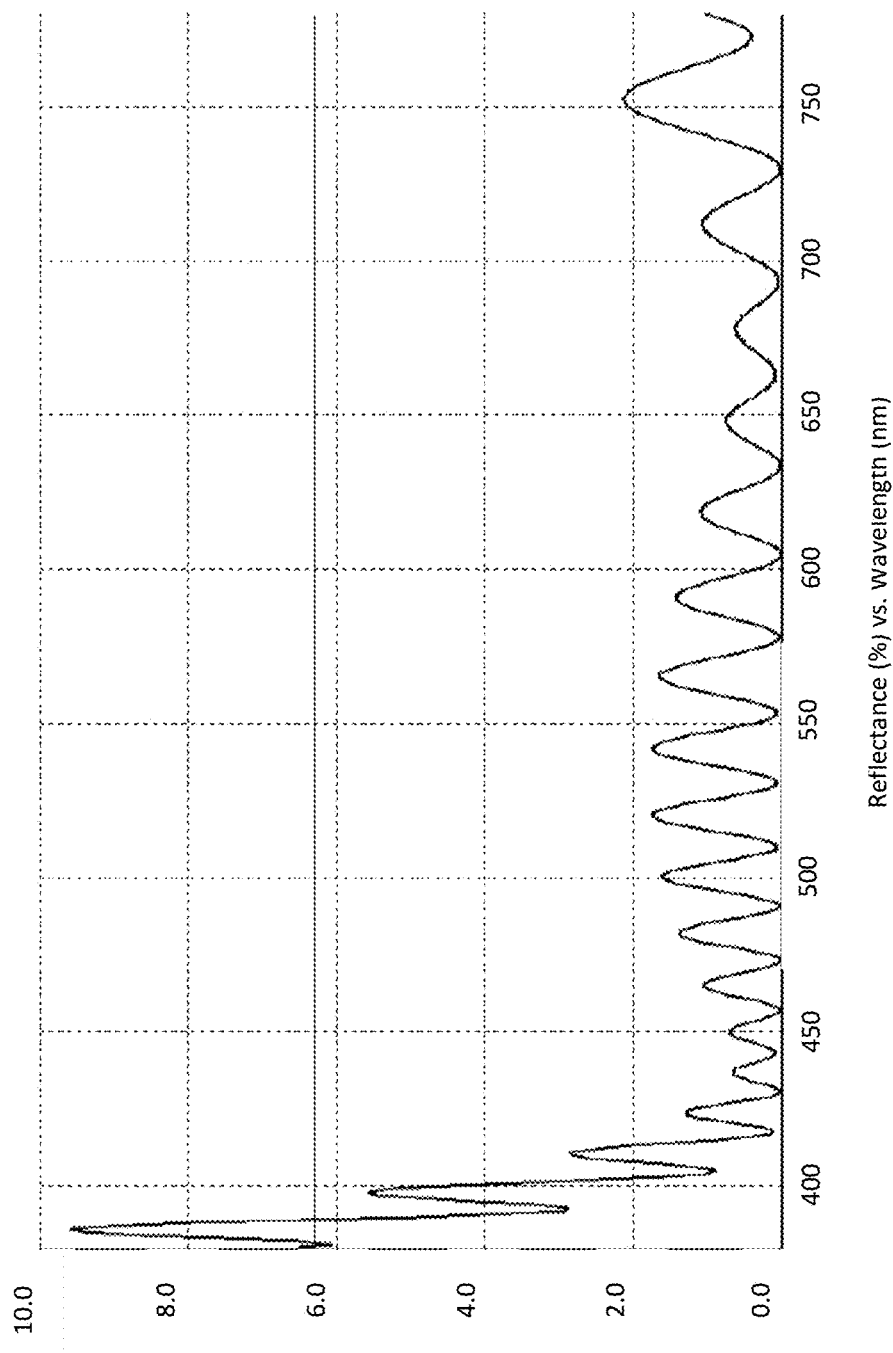
FIG. 2B is a graph showing the percent reflectance relative to wavelength of a lens having an antireflection coating with a mismatched hard-coating.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present invention provides, in part, a means of utilizing commonly available low refractive index hard-coatings with high index lenses while minimizing the effect of the typical mismatched indices and the accompanying undesirable optical effects produced by the same. This improvement is, in part, achieved by introducing an index matching system between the hard-coating and the surface of the lens or optical substrate.

Figure 4:
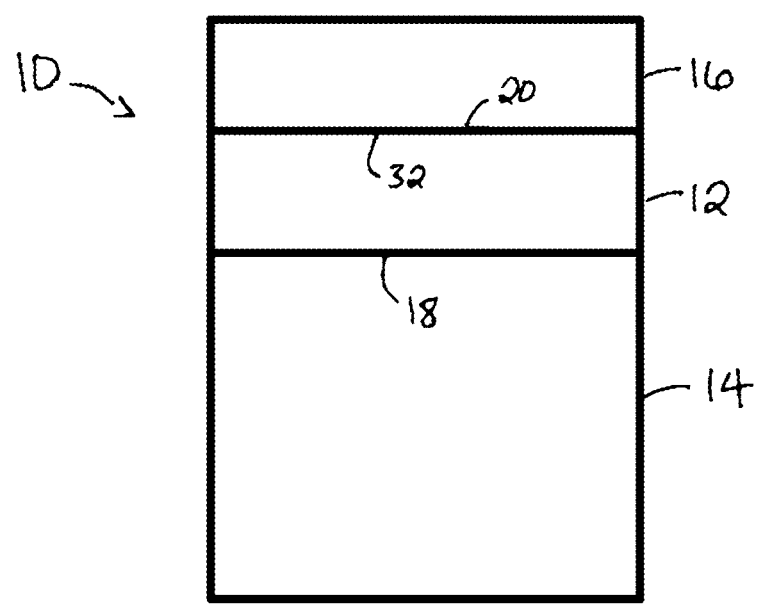
FIG. 4 is a cross-sectional view of a lens employing an index matching system according to one embodiment of the present invention.

In an embodiment of the present invention, with reference to FIG. 4, an ophthalmic eyeglass lens 10 employs an index matching system 12 that is applied, coated, or otherwise incorporated between a surface 18 of a lens substrate 14 and a surface 20 of a hard-coating 16 that are index mismatched. For example, the lens substrate 14 may have a refractive index of 1.67 and the hard-coating 16 may have a refractive index of 1.50. The surface 18 of the lens substrate 14 may be a surface of the lens substrate 14 that is closest to the eye of the lens user or wearer, i.e. may be a back-lens surface, or may be a surface of the lens substrate 14 that is farthest from the eye of the lens user or wearer, i.e. may be a front lens surface.

Figures 5, 6:
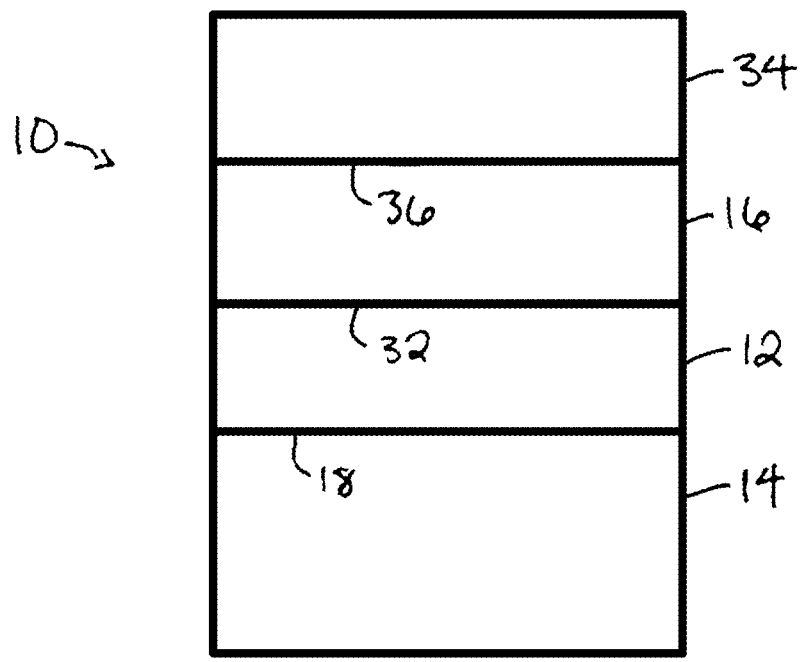
FIG. 5 is a cross-sectional view of an index matching system according to one embodiment of the present invention.
FIG. 6 is a table showing exemplary materials used for forming an index matching system according to one embodiment of the present invention.

In certain embodiments, as shown in FIG. 5, the ophthalmic eyeglass lens 10 further employs an antireflective system 34 that is applied, coated, or otherwise incorporated directly on top of a surface 36 of hard-coating 16. The antireflective system 34 may, for example, be formed of a series of alternating layers of high refractive index material, mid-refractive index material, and/or low refractive index material relative to one another.

The index matching system of the present invention is formed of a series or stack of layers of materials wherein immediately adjacent layers of materials have distinct or different refractive indices relative to one another. For example, in certain embodiments, an index matching system according to the present invention employs a first layer of a high index material, a second layer of a low index material, and a third layer formed of a same or different high index material. For example, the high index material can be zirconium dioxide, $ZrO_2$, and a low index material can be silicon dioxide, $SiO_2$.

For the sake of clarity, as used herein with regard to the inventive index matching system and antireflective systems, the term high refractive index or high index, means an index of refraction that is approximately greater than about 1.9 at a referenced wavelength, for example a wavelength of about 550 nanometers. The term low refractive index, or low index, means an index of refraction that is approximately less than about 1.55 at a referenced wavelength, for example a wavelength of about 550 nanometers. The term mid-refractive index, or mid-index, means an index of refraction approximately between about 1.55 and 1.9 at a referenced wavelength, for example a wavelength of about 550 nanometers. Low refractive index materials may include, for example, silicon dioxide. Mid-refractive index materials may include, for example, yttrium oxide, silicon oxynitride or aluminum oxide; and high refractive index materials may include, for example, titanium dioxide, tantalum pentoxide, and zirconium dioxide.

In certain embodiments, the layers of the inventive index matching system are formed of only high index materials; the layers of the index matching system are formed of only low index materials; or the layers of the index matching system are formed of only mid-index materials, wherein immediately adjacent layers of materials have distinct or different refractive indices relative to one another.

Alternatively, in certain embodiments of the present invention, the inventive index matching system is formed of alternating layers of urethane-based materials having distinct or different refractive indices. For example, in certain embodiments, the urethane-based materials are aqueous polyurethane dispersion primer coatings having distinct or different refractive indices relative to one another, for example, refractive indices in the range of about 1.47 to 1.70. Example materials are described in Publication No. US 2012/0315485 A1 the content of which is incorporated herein in its entirety. Specific examples of primers are PR1165 from SDC Technologies (n=1.50) and X105E from ITOH Optical Industrial Co (n=1.63).

FIG. 6 shows the refractive indices of exemplary materials that may be employed in the forming the inventive index matching system and that are employed in the below described examples.

The layer or layers of the index matching system of the present invention are deposited on a surface of a lens substrate or other surface by, but not limited to, vacuum deposition (e.g. e-beam, sputtering, and/or atomic layer deposition) and/or by liquid precursors (e.g. Langmuir Blodgette, spin coating, and/or dip coating). Those of skill in the art will understand that the index matching system of the present invention is suitable for deposition or implementation in prescription or Rx laboratories and/or in high-volume eyeglass lens manufacturing facilities, depending on the deposition equipment and deposition materials available and the skill level of the facility.

In certain embodiments of the present invention, the inventive index matching system is employed on non-ophthalmic applications, examples of which include, but are not limited to, display systems, optical applications (such as non-ophthalmic lenses and components), and windows. The common characteristic of the various applications of the present invention being that the application includes at least two different layers of materials having distinct refractive indices.

In certain embodiments of the present invention, the inventive index matching system is employed on injection molded and cast molded, single or multifocal eyeglass lenses. Such lenses may further employ other functional properties such as coloration, tinting, polarization, photochromism, electrochromism, UV absorption, narrow band filtering, easy-cleaning, hydrophobicity, hydrophilicity, and anti-static. Such functional properties may be imparted or incorporated into or onto such lenses in the form of coatings, treatments, films and/or film laminates.

Figure 7:
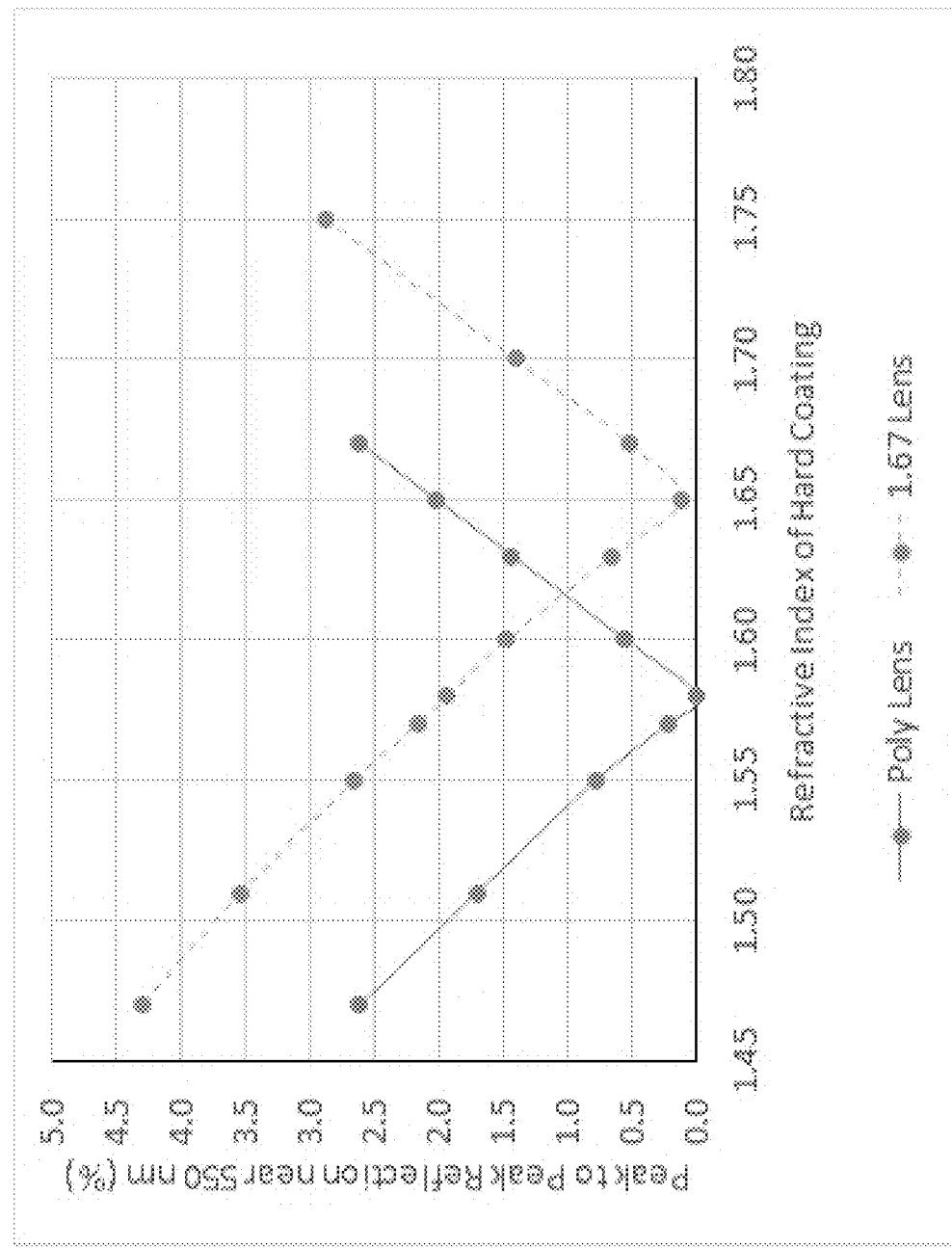
FIG. 7 is a graph showing peak-to-peak reflection variation relative to the different refractive indices of different hard-coatings applied to a base substrate.

The index matching system of the present invention, in part, advantageously reduces a peak-to-peak reflectance variation resulting from the mismatch between, for example, a hard-coating and a base lens material or substrate to which the hard-coating is applied. Two illustrative examples are shown in FIG. 7. The data shows the peak-to-peak reflection variation through the visible spectrum relative to the different refractive indices of the different hard-coatings applied to a base substrate. The "Poly Lens" samples represent hard-coatings of different indices applied to a polycarbonate base substrate having a refractive index of approximately 1.58, and "1.67 Lens" samples represent the same hard-coatings applied to a base substrate formed of cast MR10 from Mitsui having a refractive index of approximately 1.67. The data represents the average peak-to-peak height in the reflection variation due to the hard-coat to lens mismatch. The hard-coat indices are fixed to the specific value for this example and not true dispersion curves. For the sake of clarity, the peak-to-peak variation is the absolute difference in reflection between adjacent peaks and valleys in the reflection spectrum. Referencing FIG. 1, the average peak maximum is approximately 6.3 percent and the average peak minimum is approximately 2.2 percent. The peak-to-peak difference is therefore 4.1 percent.

It is evident from FIG. 7 that even relatively small index mismatches will begin inducing sizable changes in reflectance with wavelength. This will then induce noticeable changes in undesirable reflected color or colors across the optical surface of the substrate. Refractive index differences of 0.03 will induce peak-to-peak reflection variations of approximately 1%. The index matching system of the present invention advantageously reduces the average peak-topeak reflection variation in a defined wavelength band or wavelength range and, in certain embodiments, reduces the average peak-to-peak variation across the visible. In certain embodiments of the present invention, the single surface peak-to-peak reflectance variation within the visible spectrum is, for example, below 2%; below 1.0% or below 0.5%.

This novel reduction in peak-to-peak reflectance variation allows the improved use of existing hard-coatings with new high index lens materials; UV curable coatings with different lens materials; and low index hard-coatings with high index photochromic lenses in which the hard-coating and lens material are optically coupled (i.e. separated by less than 20 microns) such that interference effects are evident.

The following examples are provided to further clarify and demonstrate efficacy of the index matching system of the present invention for improving lens system performance and should not be interpreted limiting the scope and the manner of implementing the present invention.

Example 1

Figures 8, 9:
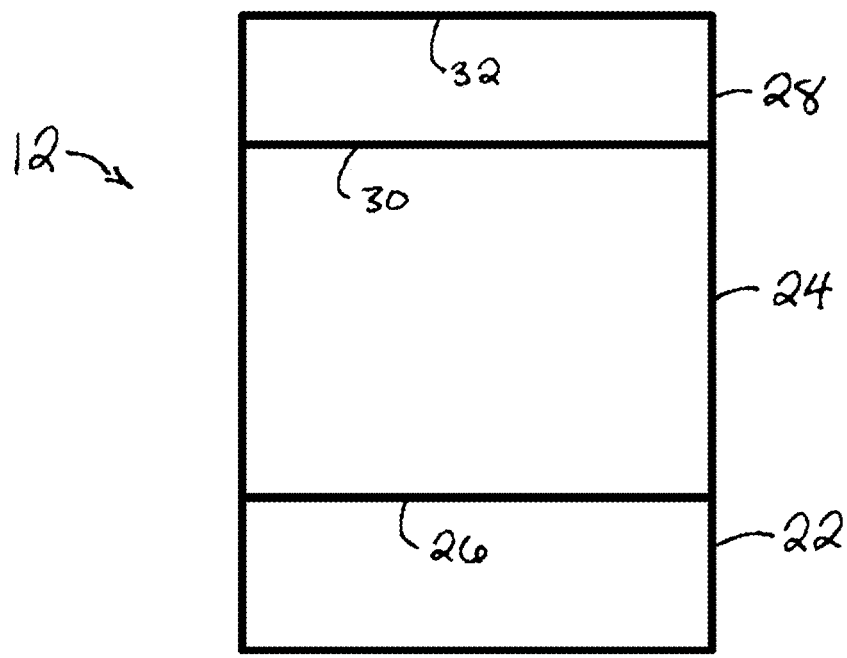
FIG. 8 is a cross-sectional view of a lens employing an index matching system according to one embodiment of the present invention.
FIG. 9 is a table showing the configuration of an index matching system according to one embodiment of the present invention.

With reference to FIGS. 4 and 8-10, a Design 1a of the inventive index matching system was modeled. With reference to FIGS. 8 and 9, the Design 1a employed the index matching system 12 formed of a first layer 22 having a thickness of 4.2 nanometers of $ZrO_2$ applied directly on the surface 18 of the lens substrate 14 (FIG. 3); a second layer 24 having a thickness of 40.0 nanometers of $SiO_2$ applied directly on a surface 26 of the first layer 22; and a third layer 28 having a thickness of 6.3 nanometers of $ZrO_2$ applied directly on a surface 30 of the second layer 24. A surface 32 of the index matching system 12 is a surface upon which the hard-coating 16 is applied or otherwise formed.

Figure 10:
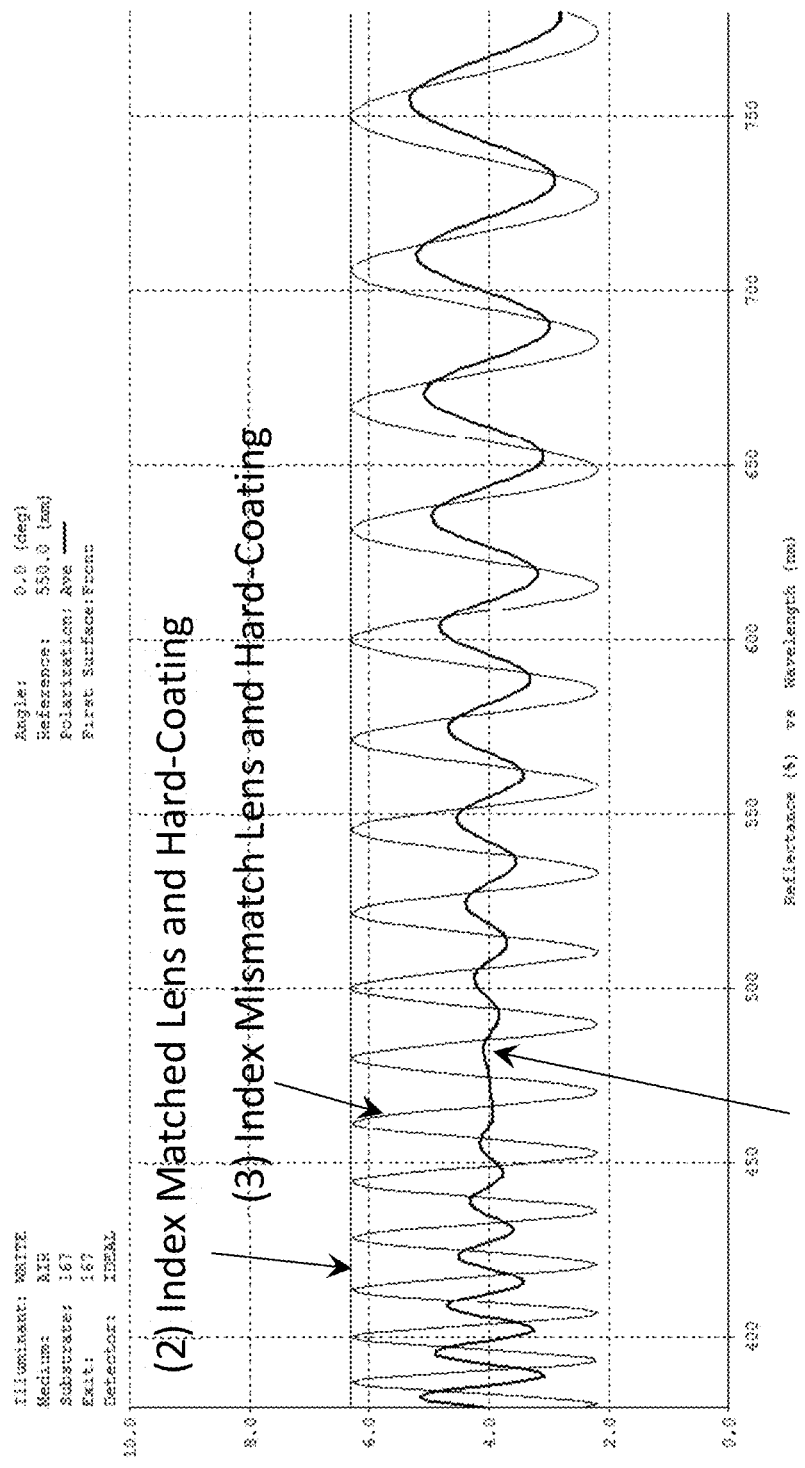
FIG. 10 is a graph comparing reflectance relative to wavelength of a lens employing an index matching system according to one embodiment of the present invention between an index mismatched lens substrate and hard-coating; and a lens employing only an index matched lens substrate and hard-coating; and a lens employing only an index mismatched lens substrate and hard-coating.

FIG. 10 compares the modeled reflection spectra for (1) a lens employing the above described inventive index matching system 12, Design 1a, disposed between a 1.67 index lens substrate 14 and a 1.5 index, mismatched hard-coating 16; (2) a lens employing a 1.67 index lens substrate 14 with an index matched hard-coating 16 (i.e. no inventive index matching system 12); and (3) a lens employing a 1.67 index lens substrate 12 with a 1.5 index, mismatched hard-coating 16 (i.e. no inventive index matching system 12). As shown in FIG. 10, the amplitude of the oscillation of the reflectance of the lens 10 employing the above described inventive index matching system 12 between a 1.67 index lens substrate 14 and a 1.5 index, mismatched hard-coating 16 (1) is greatly reduced relative to the lens employing a 1.67 index lens substrate with a 1.5 index, mismatched hard-coating and no inventive index matching system 12 (3).

Example 2

With reference to FIGS. 4, 8, 11, and 12, a Design 1b of the inventive index matching system was modeled. With reference to FIG. 11, the Design 1b employed the index matching system 12 formed of a first layer 22 having a thickness of 7.0 nanometers of $ZrO_2$ applied directly on the surface 18 of the lens substrate 14 (FIG. 3); a second layer 24 having a thickness of 50.0 nanometers of $SiO_2$ applied directly on a surface 26 of the first layer 22; and a third layer 28 having a thickness of 6.3 nanometers of $ZrO_2$ applied directly on a surface 30 of the second layer 24. A surface 32 of the index matching system 12 is a surface upon which the hard-coating 16 is applied or otherwise formed.

Figure 12:
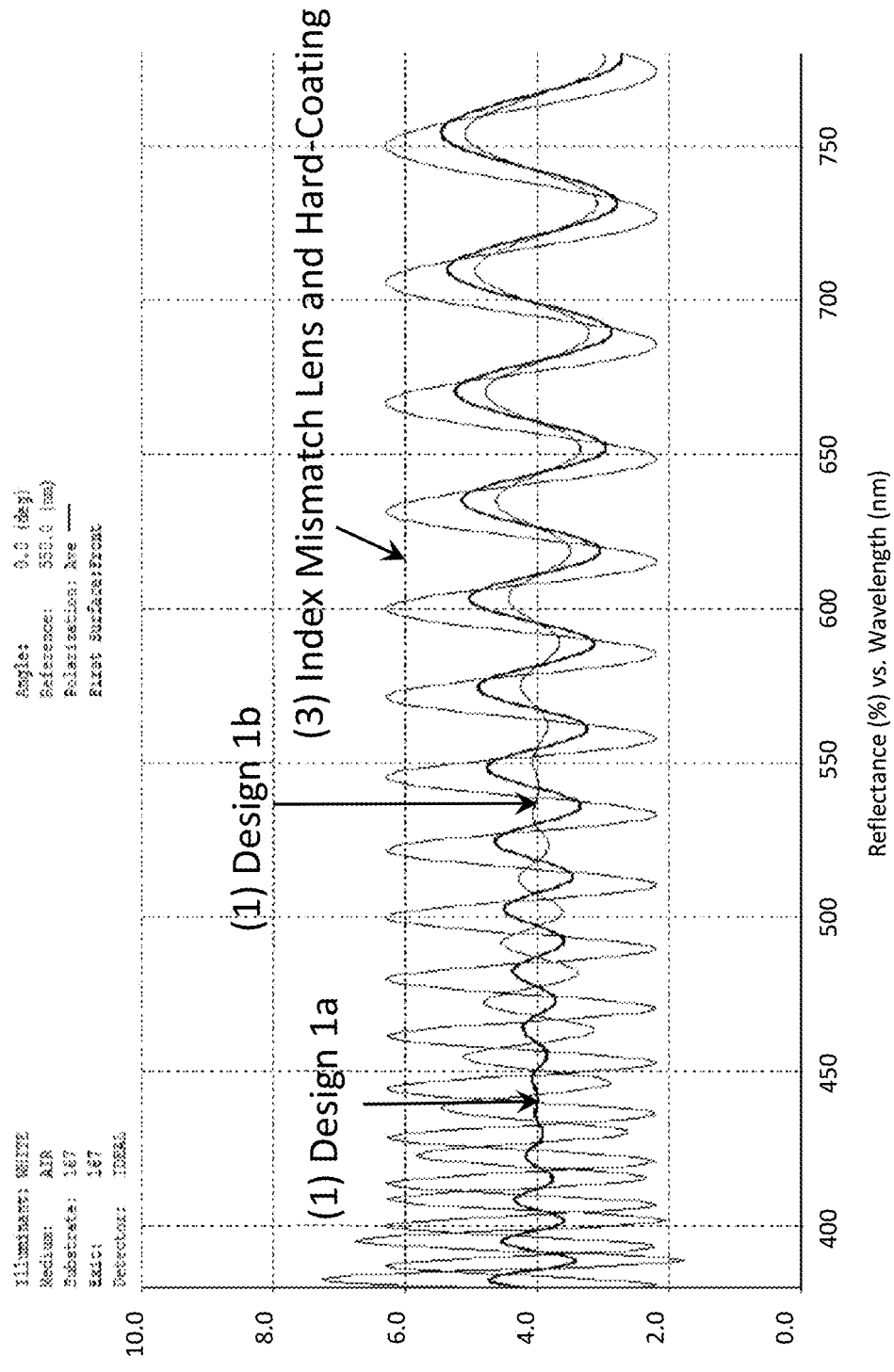
FIG. 12 is a graph comparing reflectance relative to wavelength of two different lenses employing different index matching systems according to embodiments of the present invention and a lens employing only an index mismatched lens substrate and hard-coating.

FIG. 12 compares the modeled reflection spectra for (1) a lens employing the above described index matching system of Design 1a, disposed between a 1.67 index lens substrate 14 and a 1.5 index, mismatched hard-coating 16; (2) a lens employing the above described index matching system of Design 1b, disposed between a 1.67 index lens substrate 14 and a 1.5 index, mismatched hard-coating 16; and (3) a lens employing a 1.67 index lens substrate 12 with a 1.5 index, mismatched hard-coating 16 (i.e. no inventive index matching system). As shown in FIG. 12, in certain embodiments of the present invention, a position or a range of wavelengths of minimum amplitude variation of reflectance can be selectively optimized or shifted by manipulating the thickness of the various layers of the inventive index matching system. For example, FIG. 12 shows that the lens of Design 1a described above and shown in FIG. 9 has a range of wavelengths of minimum amplitude variation of reflectance from approximately 425 to 450 nm. In contrast, the lens of Design 1b described above and shown in FIG. 11 has a range of wavelengths of minimum amplitude variation of reflectance from approximately 525 to 550 nm.

Accordingly, in certain embodiments of the present invention, the index matching system is designed to allow the edges of the spectrum of visual sensitivity (below 400 nm and above 700 nm) to have a larger variation or amplitude of reflectance since the human eye will not see the optical effect of this oscillation as easily. This range of wavelengths of minimum amplitude variation of reflectance may also be optimized according to the specific application of the index matching system, for example, so as to optimize viewing of specific displays or viewing of or through eyeglass lenses intended for use during specific activities.

Example 3

Figure 13A:
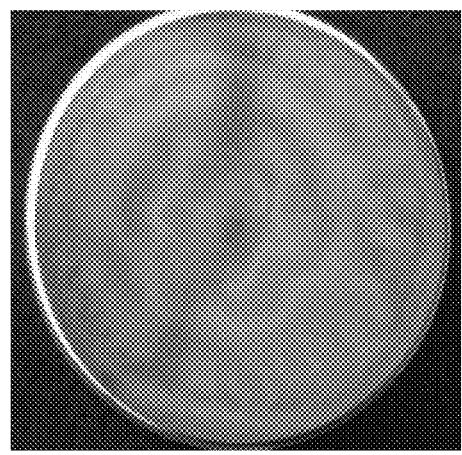
FIG. 13A is a photograph showing the visible fringes of an index mismatched lens and hard-coating.
Figure 13B:
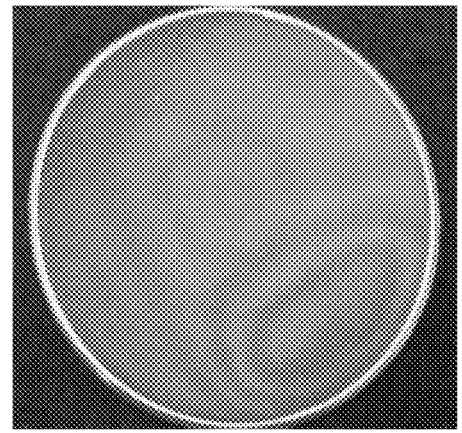
FIG. 13B is a photograph showing the visible fringes of an index mismatched lens and hard-coating employing an index matching system according to one embodiment of the present invention.

FIGS. 13A and 13B show photographs comparing two 1.70 index lenses one employing the inventive index matching system (FIG. 13B) and the other lens not employing the inventive index matching system (FIG. 13A). Both lenses shown have a commercially available UV curable 1.5 index (approximate) backside hard-coating (for example UV-NV; Ultra Optics) applied as an outer most layer.

The benefit of the index matching system of the present invention is immediately obvious from comparison of FIGS. 13A and 13B. In the standard mismatched index lens and hard-coating configuration (FIG. 13A) there are many colored fringes of irregular shapes that are tightly packed. This effect detracts from the appearance of the lens. With the inventive index matching system described above employed between the hard-coating and the lens surface (FIG. 13B), the number of fringes is greatly reduced and are spaced much further apart, hence, significantly improving the appearance of the lens.

Example 4

Figure 14:
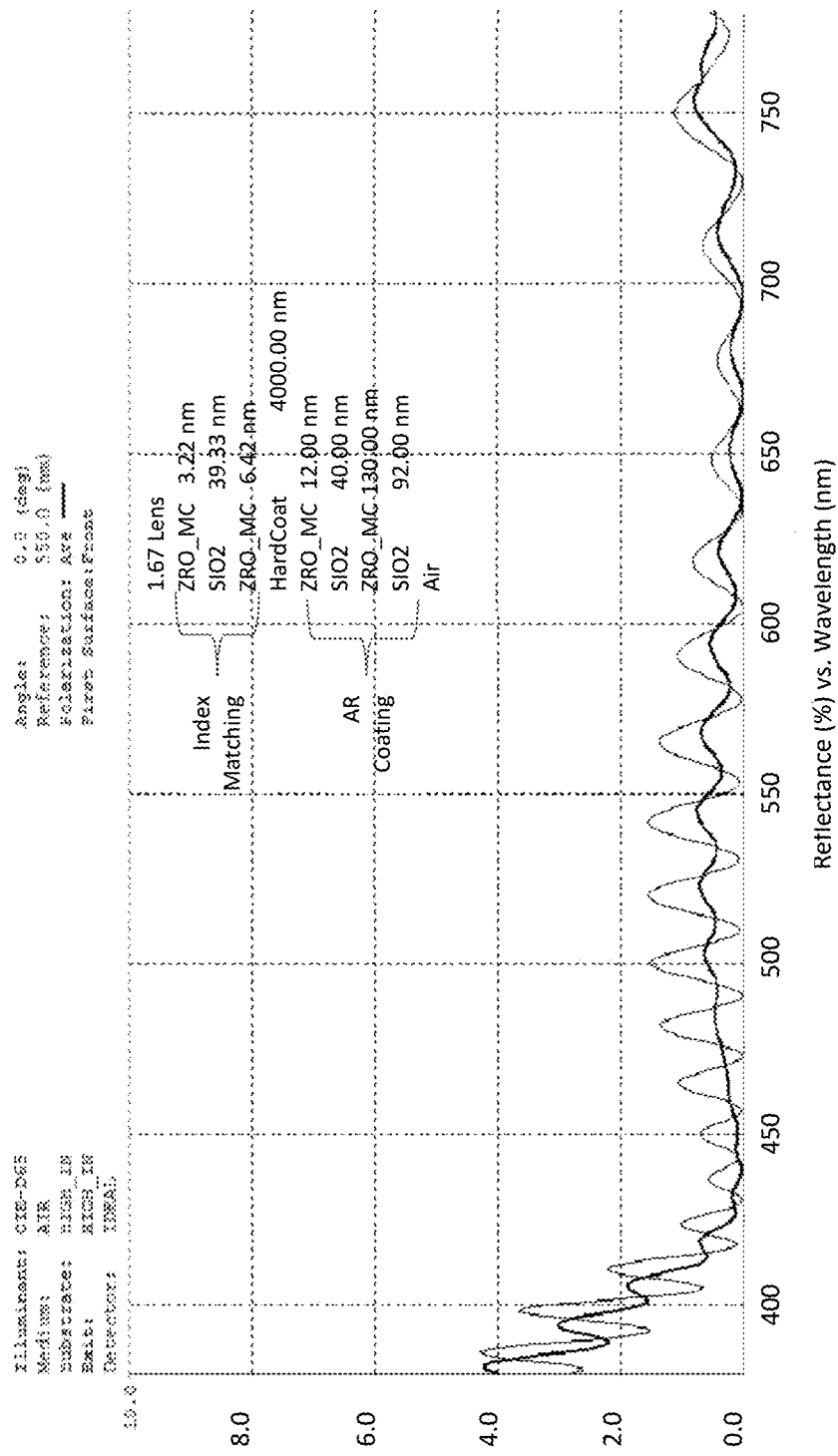
FIG. 14 is a graph comparing reflectance relative to wavelength of a lens employing an index matching system according to one embodiment of the present invention between an index mismatched lens substrate and hard-coating and an antireflective coating employed over the hard-coating and a lens employing only an index matched lens substrate and hard-coating and an antireflective coating employed over the hard-coating.
Figure 15:
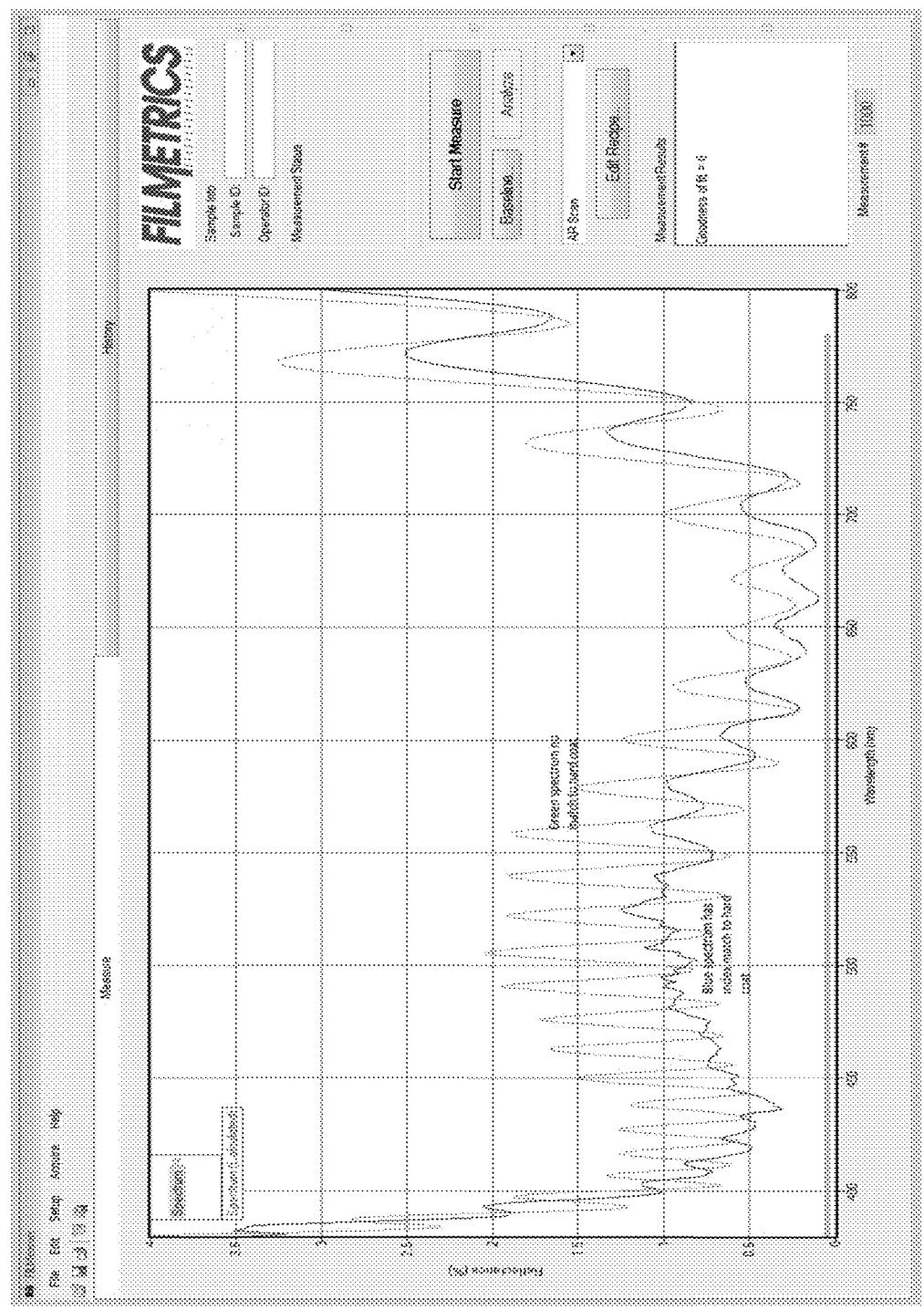
FIG. 15 is a graph comparing reflectance relative to wavelength of a lens employing an index matching system according to one embodiment of the present invention between an index mismatched lens substrate and hard-coating and an antireflective coating employed over the hard-coating and a lens employing only an index matched lens substrate and hard-coating and an antireflective coating employed over the hard-coating.

With reference to FIGS. 14 and 15, the benefit of the inventive index matching system employed between the lens and mismatched hard-coating is further realized when the inventive index matching system is employed between a lens surface and an index mismatched hard-coating and an antireflective coating is further applied on top of the hard-coating. In FIG. 14, the thin line represents the reflectance of a lens having an antireflective coating applied over an index mismatched hard-coating without employing the inventive index matching system between the lens and hard-coating. The thick line represents the reflectance of a lens having an antireflective coating applied over an index mismatched hard-coating applied over the inventive index matching system which is applied directly on the surface of the lens. The amplitude variation shown in FIG. 14 for a lens having an antireflective coating applied over an index mismatched hard-coating without employing the inventive index matching system between the lens and hard-coating will visibly alter the reflected color of the coating over the surface of the lens. Furthermore, since the hard-coating is non-uniform, the position of the oscillations shifts creating the appearance of color bands or fringes. When the inventive index matching system is employed, the magnitude of the oscillation is greatly reduced which also reduces the appearance of the color bands or fringes.

In certain embodiments of the index matching system of the present invention, the system is designed so as to minimize oscillation where the antireflective coating has a maximum amplitude of oscillation while allowing some oscillation where the antireflective coating naturally has minimum amplitude of oscillation near zero reflection. In this manner, the inventive index matching system and the antireflective system work together with the index mismatched hard-coating and lens combination to provide the best possible visual appearance with minimum color banding and maximum uniformity of appearance. This improves the aesthetic appearance and performance of high index prescription lenses.

To further show the benefits of the index matching system of the present invention, 1.67 index lenses were prepared with and without the inventive index matching system between the lens surface and the hard-coating and then an antireflective coating was applied over the hard-coating. For the antireflective coating, a standard five-layer antireflective (AR) coating was used. The resulting spectra are shown in FIG. 15 (measured from a Filmetrics spectrometer, hence, only showing a back-lens surface reflectance). The benefit of employing the inventive index matching system is clearly evident through the reduced amplitude of the oscillation of reflectance.

Example 5

Figure 3:
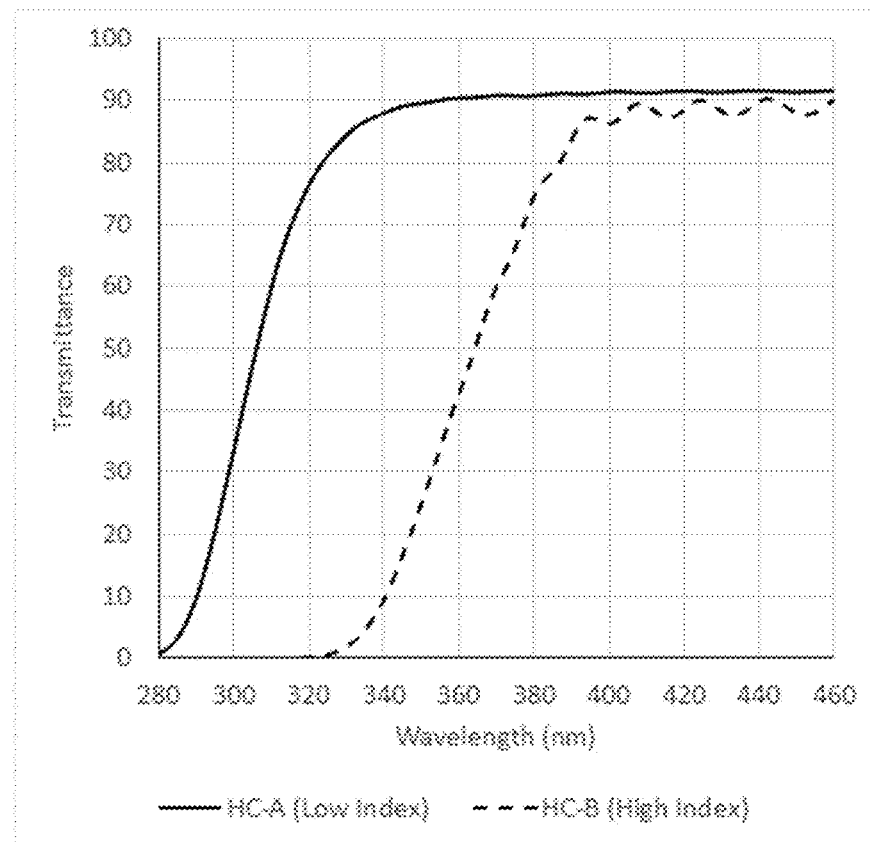
FIG. 3 is a graph showing the transmission relative to wavelength of two commercially available hard-coatings.

In further embodiments of the index matching system of the present invention, a layer stack of $Y_2O_3$ and $SiO_2$ is used to form the desired matching coating. A mid-index coating of $Y_2O_3$ is a desirable material since the index is closer to that of common eyeglass lens materials. Additionally, both $Y_2O_3$ and $SiO_2$ are readily deposited by E-Beam evaporation which allows for control of coating stress. This helps reduce propensity for coating cracking or crazing as layer and system thicknesses increase. A Design 2 of the inventive index matching system is shown in FIG. 16. For the sake of clarity, the system shown in FIG. 16 is substantially similar to the system shown and described with respect to FIGS. 4 and 8, with the exception that the inventive system of Design 2 employs additional layers 23, 24, 28, $n_1$, $n_2$, $n_3$, etc. between the surface 18 of the lens substrate 14 and the hard-coating 16 (FIG. 3).

Figure 17:
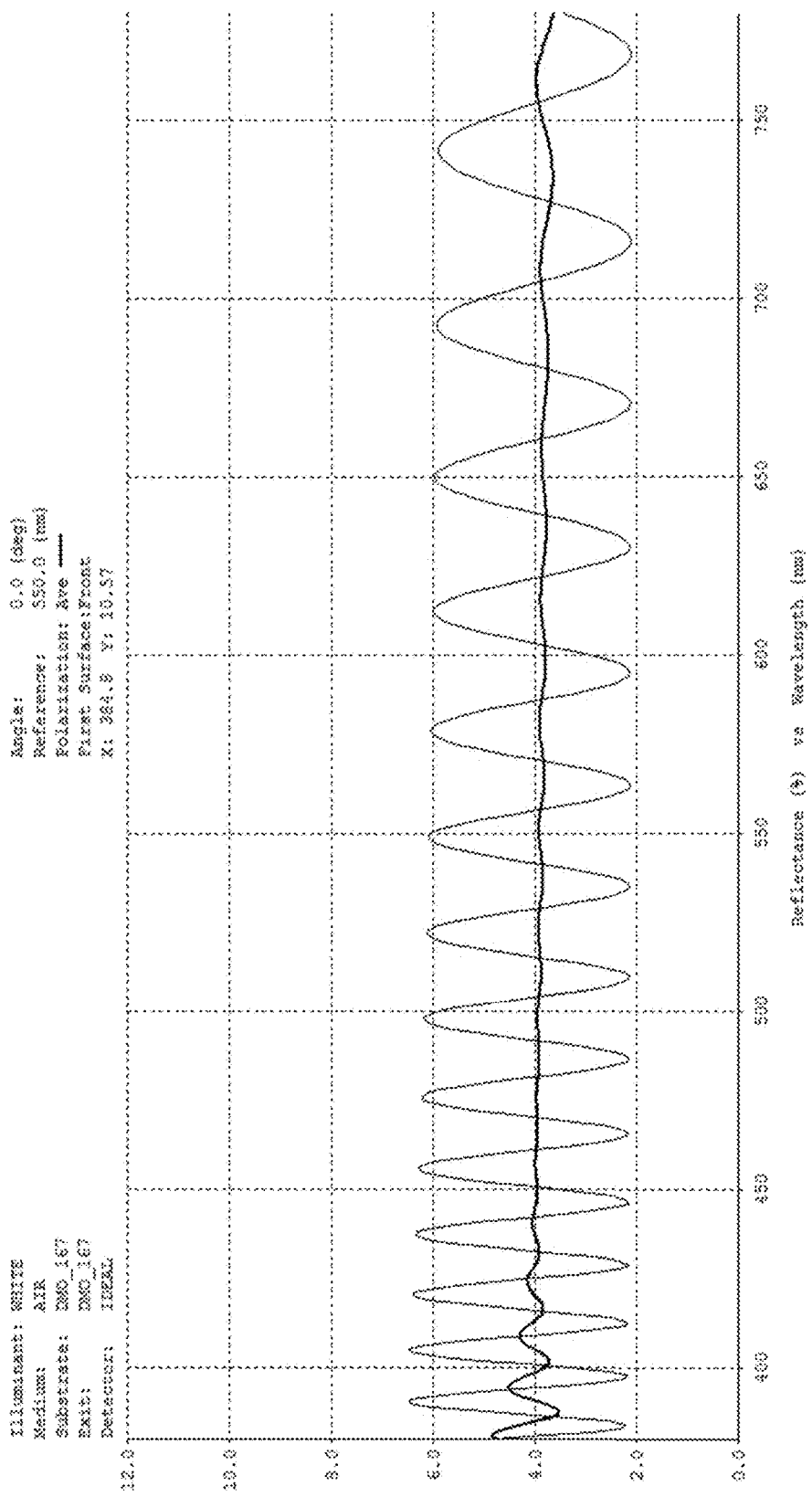
FIG. 17 is a graph comparing reflectance relative to wavelength of a lens employing an index matching system according to one embodiment of the present invention between an index mismatched lens substrate and hard-coating and a lens employing only an index matched lens substrate and hard-coating.

The modeled reflection spectrum of the system of Design 2 disposed between a 1.67 index lens substrate and a 1.5 index, mismatched hard-coating (thick line) and a lens employing a 1.67 index lens substrate with a 1.5 index, mismatched hard-coating without the inventive index matching system (thin line) is shown in FIG. 17. The performance of the inventive index matching system to reduce the variation in the reflection spectrum is obvious and significant, e.g. below approximately 0.5% across most of the visible spectrum. This is impressive performance for combining a 1.50 index hard-coating with a 1.67 index lens, reducing the peak-to-peak variation by a factor of 7 (see FIG. 7).

The index matching system Design 2 was further tested and used to coat a 1.67 index lens containing a photochromic laminate embedded in the lens. Exemplary methods for formation of such high index photochromic lenses are described in the Assignee's Pub. No. US 2017/0165878 A1, the content of which is herein incorporated by reference in its entirety.

The photochromic response was measured for lenses with (a) no hard-coating (1.67 Photo NHC); (b) with a low index 1.48 hard-coating and no inventive index matching system (1.67 Photo No Match); (c) with a 1.48 index hard-coating with the inventive index matching system of Design 2 (1.67 Photo with Match); (d) with a 1.60 index hard-coating and no inventive index matching system (1.67 Photo H604); and (e) with a 1.67 index matched hard-coating and no inventive index matching system (1.67 Photo with Match). The luminous transmission (Y) for the photochromic inactivated (clear) and activated transmission (darkened state) for these sample lenses are shown in FIG. 18.

As evident from FIG. 18, the high index hard-coatings increase the activated transmission (Y-Activated) by approximately 5, thereby degrading the photochromic performance relative to an uncoated lens by a significant, visually noticeable amount. This is expected due to the UV absorption of the high index hard-coating, as shown in FIG. 7. Using a low index hard-coating the photochromic performance is recovered and improved upon relative to the uncoated lens. This improvement is a result of the overall increase in UV transmission into the lens with a low index hard-coating. The two low index hard-coated samples are nominally the same for activation.

Figure 19:
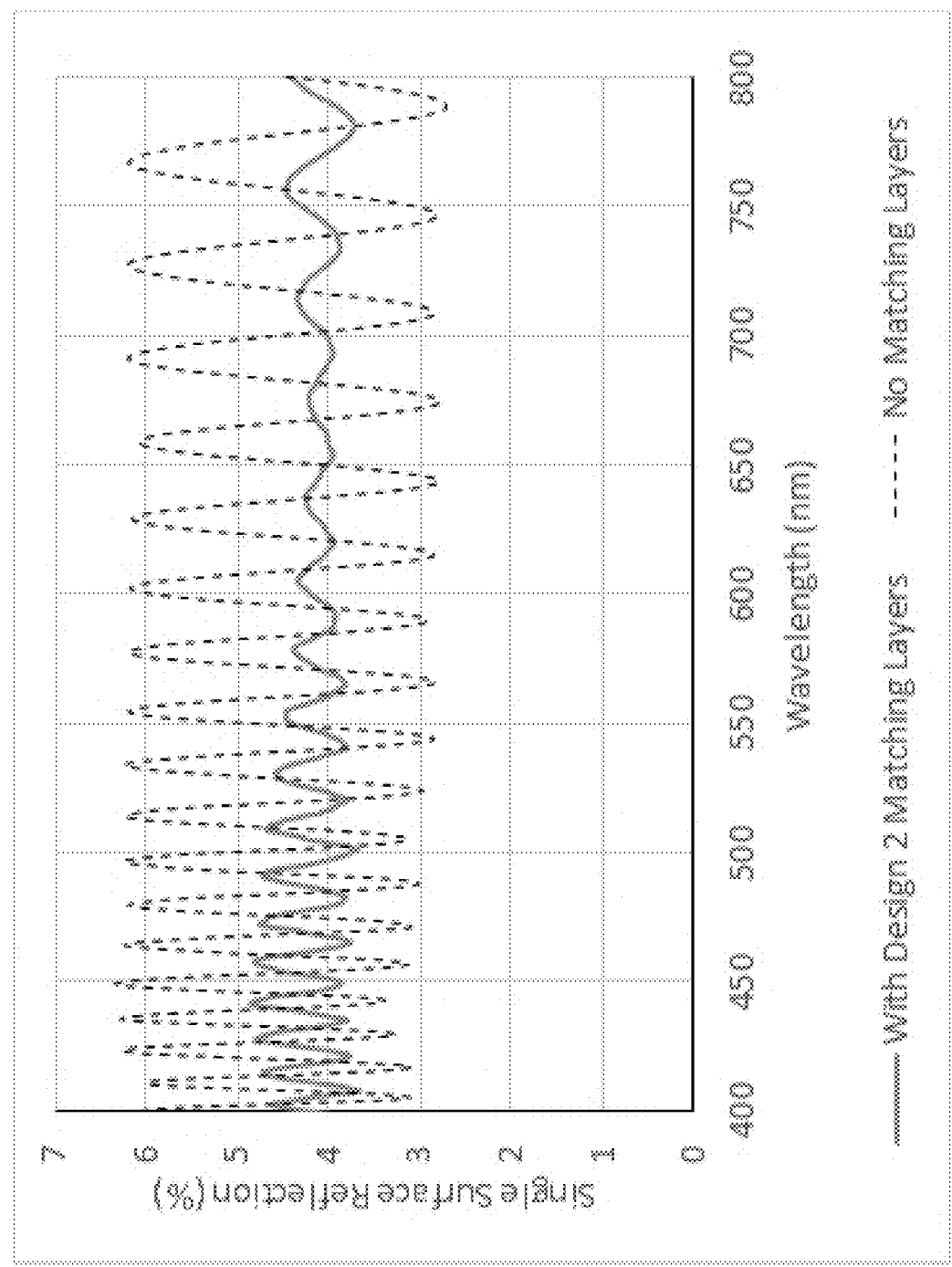
FIG. 19 is a graph comparing reflectance relative to wavelength of a photochromic lens employing an index matching system according to one embodiment of the present invention between an index mismatched lens substrate and hard-coating and a photochromic lens not employing the inventive index matching system between an index mismatched lens substrate and hard-coating.

FIG. 19 shows the reflection spectrum for lenses with a 1.48 index hard-coating with the inventive index matching system of Design 2 (solid line) and for lenses with a low index 1.48 hard-coating and no inventive index matching system (broken line). As evident from FIG. 19, the sample not employing the inventive coating has a peak-to-peak variation in the reflection greater than 3%. This leads to easily observable color fringes across the lens surface. On the other hand, the sample employing the inventive coating has a greatly reduced variation in the reflection (less than 1%). This small amplitude does not result in noticeable color fringes, thereby, improving the appearance of the lens system. Hence, the inventive index matching system of the present invention makes it possible to maintain and even improve upon the photochromic performance while maintaining the visual color band free appearance of the lens.

Figures 20, 21:
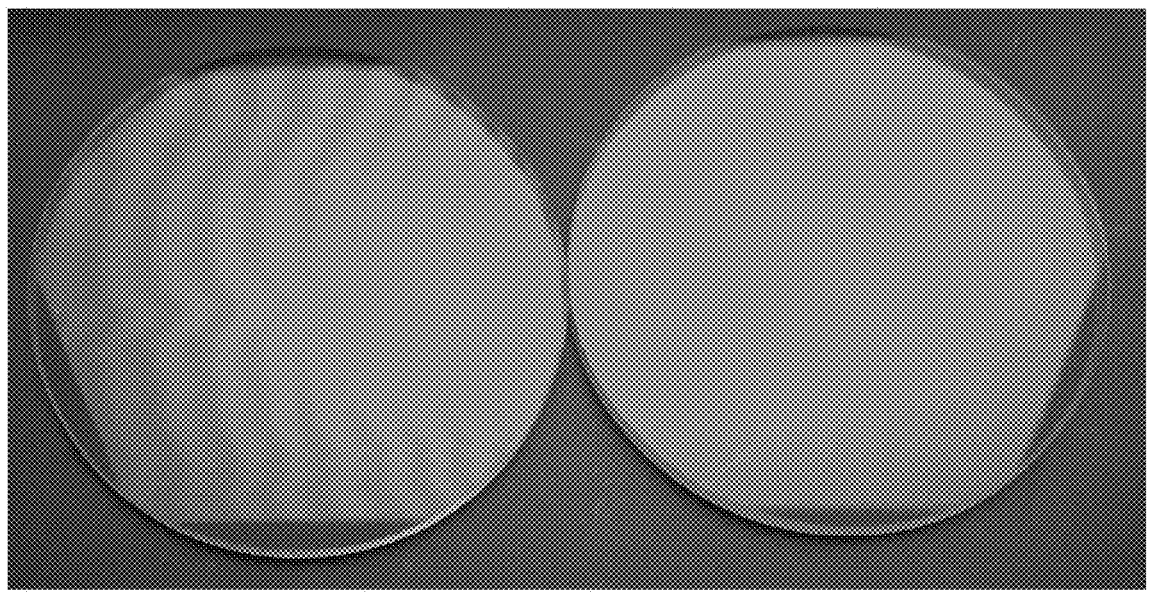
FIG. 20 is a photograph of a photochromic lens employing an index matching system according to one embodiment of the present invention between an index mismatched lens substrate and hard-coating and a photochromic lens not employing the inventive index matching system between an index mismatched lens substrate and hard-coating.
FIG. 21 is a table showing the configuration of an index matching system according to one embodiment of the present invention.

FIG. 20 shows photographs of a sample lens with a 1.48 index hard-coating with the inventive index matching system of Design 2 (A) and for lenses with a low index 1.48 hard-coating and no inventive index matching system (B). The benefit of the index matching system of the present invention is immediately obvious from comparison of lenses (A) and (B). In the lens with a low index 1.48 hard-coating and no inventive index matching system (B) there are many fringes of irregular shapes that are tightly packed. This effect detracts from the appearance and, hence, the value of the lens. With the inventive index matching system described above employed between the hard-coating and the lens surface (A), the number of fringes is greatly reduced, if not absent, and, hence, significantly improves the appearance and value of the lens.

Example 6

In yet another example of the index matching system of the present invention, a system employing alternating layers of $SiO_xN_y$ and $SiO_2$ was modeled. A mid-index layer $SiO_xN_y$ is a desirable material since the index is close to that of common lens materials and can be controlled between the index of $SiO_2$ (1.46) and $SiO_3N_4$ (2.0). $SiO_xN_y$ is readily deposited by sputtering using a silicon target and a controlled supply of oxygen and nitrogen. This provides versatility in a coating platform—a wide range of indices from 1.46 to 2.0 can be deposited from just one target. An index matching system Design 3 is shown in FIG. 21. For the sake of clarity, the system shown in FIG. 21 is substantially similar to the system shown and described with respect to FIGS. 4 and 8, with the exception that the inventive system of Design 3 employs additional layers 23, 24, 28, $n_1$, $n_2$, $n_3$, etc. between the surface 18 of the lens substrate 14 and the hard-coating 16 (FIG. 3).

Figure 22:
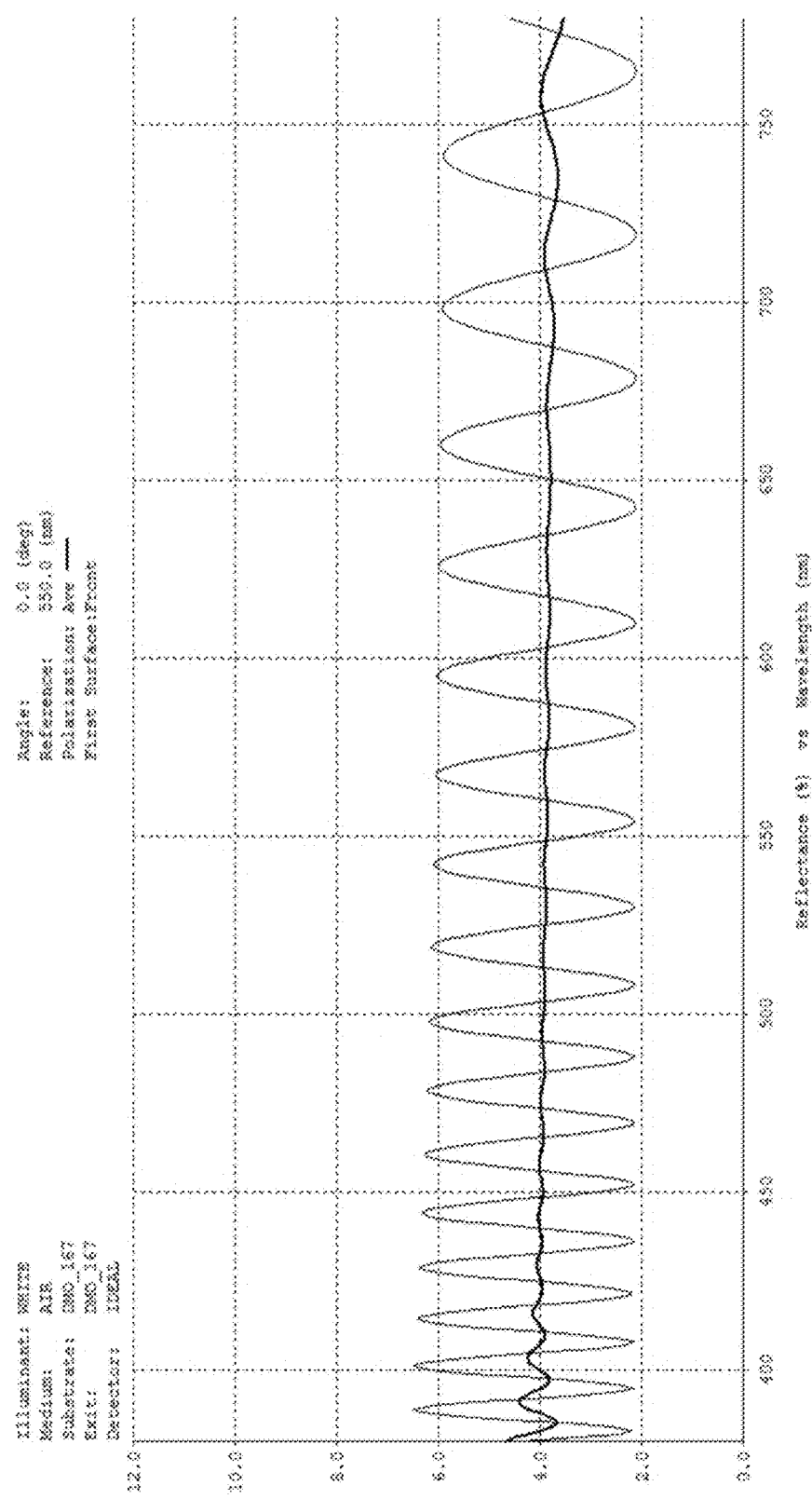
FIG. 22 is a graph comparing reflectance relative to wavelength of a lens employing an index matching system according to one embodiment of the present invention between an index mismatched lens substrate and hard-coating and a lens employing only an index matched lens substrate and hard-coating.

The modeled reflection spectrum of the system of Design 3 disposed between a 1.67 index lens substrate and a 1.50 index, mismatched hard-coating (thick line) and a lens employing a 1.67 index lens substrate with a 1.5 index, mismatched hard-coating without the inventive index matching system (thin line) is shown in FIG. 22. The performance of the inventive index matching system to reduce the variation in the reflection spectrum is obvious and significant, e.g. below approximately 0.5% across most of the visible spectrum. This is impressive performance for combining a 1.50 index hard-coating with a 1.67 index lens, reducing the peak-to-peak variation by a factor of 7 (see FIG. 7).

Example 7

In another embodiment of the index matching system of the present invention, a layer stack of different urethane dip coatings is employed. Such coatings are described in Publication No. US 2012/0315485 A1 the content of which is incorporated herein in its entirety. Such material layers offer the ability to vary the refractive index of the coating from 1.50 to higher values. Such materials may be hard-coatings or more commonly urethane primer layers used to improve adhesion between a lens and hard-coating. Such coatings are used in high volume manufacturing employing dip coating processes. A Design 4 of the inventive index matching system is shown in FIG. 23. For the sake of clarity, the system shown in FIG. 23 is substantially similar to the system shown and described with respect to FIGS. 4 and 8, with the exception that the inventive system of Design 4 employs additional layers 23, 24, 28, $n_1$, $n_2$, $n_3$, etc. between the surface 18 of the lens substrate 14 and the hard-coating 16 (FIG. 3).

Figure 24:
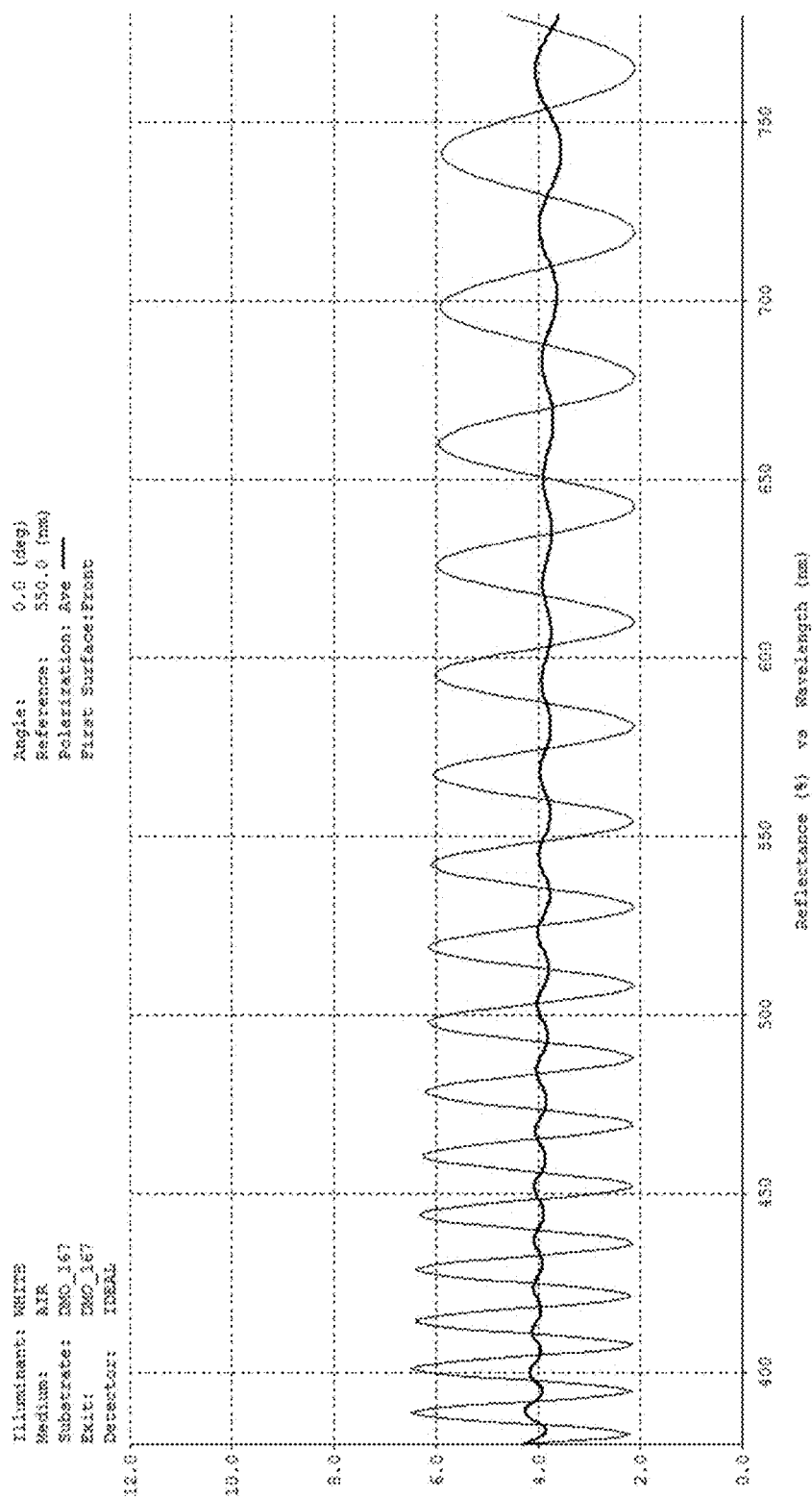
FIG. 24 is a graph comparing reflectance relative to wavelength of a lens employing an index matching system according to one embodiment of the present invention between an index mismatched lens substrate and hard-coating and a lens employing only an index matched lens substrate and hard-coating.

The modeled reflection spectrum of the system of Design 4 disposed between a 1.67 index lens substrate and a 1.50 index, mismatched hard-coating (thick line) and a lens employing a 1.67 index lens substrate with a 1.5 index, mismatched hard-coating without the inventive index matching system (thin line) is shown in FIG. 24. The performance of the inventive index matching system to reduce the variation in the reflection spectrum is obvious and significant, e.g. below approximately 0.5% across most of the visible spectrum. This is impressive performance for combining a 1.50 index hard-coating with a 1.67 index lens, reducing the peak-to-peak variation by a factor of 7 (see FIG. 7).

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An eyeglass lens having reduced interference fringes comprising:
    a base lens substrate having a first refractive index;
    an index matching system disposed on a surface of the base lens substrate and having a plurality of index matching layers that form a pattern alternating between an increased and decreased index of refraction relative to 1) index matching layers immediately adjacent or to 2) the base lens, and
    a coating disposed on a surface of the index matching system having a second refractive index that differs from the first refractive index by 0.08 or greater.

2. The eyeglass lens of claim 1 wherein the base lens substrate comprises a high index lens material.

3. The eyeglass lens of claim 1 wherein the base lens substrate comprises a functional film laminate.

4. The eyeglass lens of claim 1 wherein the base lens substrate comprises a photochromic property.

5. The eyeglass lens of claim 1 wherein the index matching system is disposed on a back surface of the base lens substrate.

6. The eyeglass lens of claim 1 wherein the index matching system comprises a series of layers of materials wherein immediately adjacent layers of materials have distinct refractive indices relative to one another.

7. The eyeglass lens of claim 1 wherein the index matching system comprises a series of alternating urethane-based layers having different refractive indices.

8. The eyeglass lens of claim 1 wherein the coating is a UV cured hard-coating.

9. The eyeglass lens of claim 1 wherein the first refractive index is equal to or greater than 1.60 and the second refractive index is approximately 1.50.

10. The eyeglass lens of claim 1 further comprising an antireflective system disposed on the coating.

11. The eyeglass lens of claim 1 wherein the eyeglass lens has a single surface peak-to-peak reflectance variation within the visible spectrum of equal to or less than 2 percent.

12. A system for improving optical characteristics in optical devices comprising:
    a first material layer having a first refractive index;
    a second material layer having a second refractive index different from the first refractive index; and
    an index matching system interposed between the first material layer and the second material layer that attenuates a total reflectance of incident light of the optical device; the index matching system comprising a plurality of index matching layers that form a pattern alternating between an increased and decreased index of refraction relative to 1) index matching layers immediately adjacent or to 2) the first material.

13. The system of claim 12 wherein the optical device is an eyeglass lens.

14. The system of claim 12 wherein the optical device has a single surface peak-to-peak reflectance variation within the visible spectrum of equal to or less than 2 percent.

15. The system of claim 12 wherein the index matching system comprises a multilayered system.

16. A method for reducing interference fringes observed in an optical article comprising:
    obtaining a base lens substrate having a first refractive index;

forming an index matching system on a surface of the base lens substrate having a plurality of material layers that form a pattern alternating between an increased and decreased index of refraction relative to 1) index matching layers immediately adjacent or to 2) the base lens; and applying a coating on a surface of the index matching system having a second refractive index that differs from the first refractive index by 0.08 or greater.

17. The method of claim 16 wherein obtaining the base lens substrate having the first refractive index comprises obtaining an eyeglass lens.

* * * * *